(12) United States Patent
Anatole et al.

(10) Patent No.: US 10,705,508 B2
(45) Date of Patent: Jul. 7, 2020

(54) METHOD FOR GENERATING SETTINGS FOR MACHINING AN OPTICAL LENS

(71) Applicant: ESSILOR INTERNATIONAL, Charenton-le-Pont (FR)

(72) Inventors: Vincent Anatole, Charenton-le-Pont (FR); Cedric Sileo, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 102 days.

(21) Appl. No.: 15/766,572

(22) PCT Filed: Oct. 7, 2016

(86) PCT No.: PCT/FR2016/052604
§ 371 (c)(1),
(2) Date: Apr. 6, 2018

(87) PCT Pub. No.: WO2017/060655
PCT Pub. Date: Apr. 13, 2017

(65) Prior Publication Data
US 2018/0284728 A1    Oct. 4, 2018

(30) Foreign Application Priority Data
Oct. 9, 2015 (FR) .................................. 15 59621

(51) Int. Cl.
*G05B 19/4093* (2006.01)
*B24B 9/14* (2006.01)
(Continued)

(52) U.S. Cl.
CPC ........ *G05B 19/40938* (2013.01); *B24B 9/148* (2013.01); *B24B 13/00* (2013.01);
(Continued)

(58) Field of Classification Search
CPC .... G05B 19/40938; G05B 2219/36268; G05B 2219/36296; G05B 19/4097; B24B 9/148; B24B 13/00; B24B 13/0052; Y02P 90/265
See application file for complete search history.

(56) References Cited

U.S. PATENT DOCUMENTS 4,980,993 A * 1/1991 Umezaki ............. B24B 13/0025
451/279
5,272,622 A   12/1993 Mizukami
(Continued)

FOREIGN PATENT DOCUMENTS

FR     1 457 240 A    7/1966

OTHER PUBLICATIONS

International Search Report, dated Jan. 13, 2017, from corresponding PCT/FR2016/052604 application.

*Primary Examiner* — Ryan A Jarrett
(74) *Attorney, Agent, or Firm* — Young & Thompson

(57) ABSTRACT

Disclosed is a method for generating settings for machining an optical lens, including: a) acquiring a file characterizing the shape to which the optical lens must be machined in order to allow it to be mounted in a spectacle frame; b) decomposing the shape into a plurality of distinct objects, including an exterior envelope inside of which all the other objects are located; c) determining a machining order of the other objects; and d) generating the machining settings depending on the machining order.

20 Claims, 2 Drawing Sheets

(51) Int. Cl.
*B24B 13/00* (2006.01)
*B24B 13/005* (2006.01)

(52) U.S. Cl.
CPC ............... *B24B 13/0052* (2013.01); *G05B 2219/36268* (2013.01); *G05B 2219/36296* (2013.01); *Y02P 90/265* (2015.11)

(56) References Cited

U.S. PATENT DOCUMENTS

| | | |
|---|---|---|
| 5,532,933 A | 7/1996 | Nakata |
| 6,676,344 B1 | 1/2004 | Amatt |
| 2003/0097741 A1* | 5/2003 | Feldman ............... B23Q 1/52 29/26 A |
| 2004/0186614 A1 | 9/2004 | Yamaguchi et al. |
| 2010/0305745 A1 | 12/2010 | Iriguchi et al. |
| 2013/0325165 A1* | 12/2013 | Song ............... G05B 19/4097 700/186 |
| 2014/0041184 A1* | 2/2014 | Schneider ............... B24B 9/14 29/407.04 |
| 2015/0277153 A1* | 10/2015 | Hagen ............... G02C 13/001 700/98 |

* cited by examiner

Fig.3
| Position | Identifier | Radius of curvature | RC$_{min}$ | Closest object |
|---|---|---|---|---|
| External | 7 | Positive | | |
| External | 1 | Negative | R1>R6>R2 > R3>R5-4 | 3 > 6 > 4 > 5 > 2 |
| External | 6 | Negative | | |
| External | 2 | Negative | | 2: 5 > 4 > 6 > 3 > 1 |
| External | 5 | Negative | | 5: 4 >2 > 6 > 3 > |
| External | 4 | Negative | | |
| Internal | 3 | Negative | | |
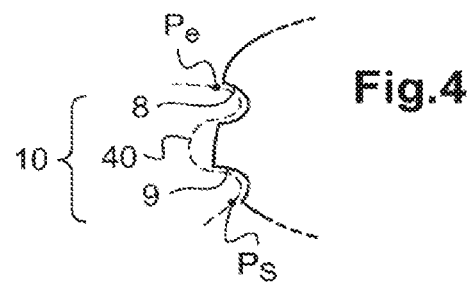
Fig.4
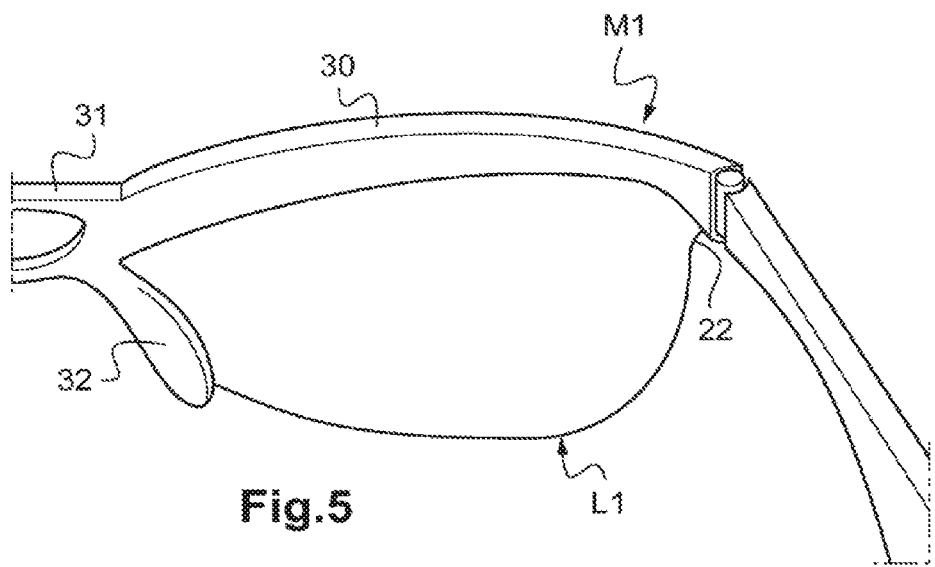
Fig.5

METHOD FOR GENERATING SETTINGS FOR MACHINING AN OPTICAL LENS

TECHNICAL FIELD OF THE INVENTION

The present invention generally relates to the field of eyeglasses.

It more particularly relates to a method for generating settings for machining an optical lens, with a view to mounting it in a spectacle frame.

The invention has a particularly advantageous application in the machining of optical lenses of complex shapes, i.e. in the machining of lenses not able to be machined by means of one and the same tool.

TECHNOLOGICAL BACKGROUND

The technical part of an optician's job consists in mounting a pair of optical lenses in a spectacle frame selected by a wearer.

This mounting operation includes a first step of acquiring the geometry of the rims of the selected spectacle frame, and a second step of machining the lens, which in particular comprises an operation in which the outline of the lens is edged to the desired shape.

This edging operation consists in removing the superfluous peripheral portion of the optical lens in question, in order to machine its outline, which is most often initially circular, to an outline of identical shape to that of the outline of the rim of the spectacle frame or of similar shape.

Specifically, when the spectacle frame is rimmed, the acquiring step generally consists in probing the interior outline (the "bezel") of the rim of the selected spectacle frame so as to precisely determine the coordinates of points characterizing the shape of the outline of this bezel.

The edging step then consists in machining the edge of the optical lens in such a way that it has, all the way around its outline, a bevel to be engaged in the bezel, the top of which has a shape that is substantially identical to that of the outline of the bezel.

This type of spectacle frame remains the type that is most commonly used. Moreover, implementation thereof is simple to automate. Therefore, a communication protocol has been developed in order to allow acquiring machines and machining machines to communicate together, in order to automate these two steps of acquiring and machining.

When the spectacle frame is more complex (semi-rimmed, rimless, or hybrid), these two steps are carried out differently.

In the acquiring step, a template (for example the reference lens supplied to the optician with the spectacle frame) is generally used to determine the shape required for the optical lens to be edged. Specifically, the acquisition of an image of this template allows the shape of the outline of this template and the position of any holes made in this template to be seen.

The subsequent machining step will then comprise an edging operation, then finishing operations (grooving, drilling, etc.) in order to allow the optical lens to be mounted in its frame.

These edging and finishing operations will vary substantially depending on the type of spectacle frame and on the complexity of the machining.

Thus, the aforementioned communication protocol cannot be used.

Each machining machine then has its own language and its own software allowing the optician to input the information required to machine each optical lens.

One drawback is that this software is generally not optimized to decrease the duration of the machining cycle of the lens.

Another drawback is that the operation of inputting information is long and tedious for the optician to implement.

To partially mitigate this drawback, the machining machine may be equipped with a memory allowing the settings for machining the optical lens to be stored. In this way, when another lens must be machined in order to be mounted in a spectacle frame of the same type, the machining machine may reuse these machining settings.

The problem with these machining settings is that not only are they not standard (they are generated depending on the characteristics of the machining machine and on the prescriptions of the wearer, and hence they are specific to this machine and to the wearer), but they are furthermore static (they cannot be adjusted when the characteristics of the machining machine change or when the prescriptions of the wearer change).

Specifically, it will be understood that these machining settings contain instructions that allow, given for example the diameters of the tools used, the optical lens to be machined to the desired shape.

Thus, these machining settings are valid only for one particular type of machining machine and they remain valid for this type of machine only for as long as the machining machine is not modified. As soon as a machining tool is replaced by another more effective tool of different shape, all of the stored machining settings become unusable.

SUBJECT OF THE INVENTION

In order to remedy the aforementioned drawbacks of the prior art, the present invention provides a new standard communication protocol that allows files of machining settings that are exploitable by machining machines of different models to be generated and that allows the duration of the machining cycle of the optical lens to be decreased.

More particularly, according to the invention a method for generating machining settings is provided, this method including steps consisting in:

a) acquiring a file characterizing the shape to which the optical lens must be machined in order to allow it to be mounted in a spectacle frame, b) decomposing said shape into a plurality of distinct objects, including an exterior envelope inside of which all the other objects are located, c) determining a machining order of said other objects, and d) generating the machining settings depending on said machining order.

Preferably, in step d), the machining settings are generated independently of the features of any machining machine liable to be used to machine the optical lens.

Dividing the shape of the lens to be machined into "objects" makes it possible to treat each object differently and to determine a priori (i.e. without yet knowing which machining machine will be used to machine the optical lens) what type of tool will be necessary to machine this object. The machining settings will thus possibly include instructions for machining each object, i.e. instructions tailored to the shape of the object.

Determining the machining order, for its part, makes it possible to determine a priori in what order the objects must be machined in to decrease the duration of the machining cycle (in particular by minimizing the number of required tool changes).

Further advantageous and nonlimiting features of the method according to the invention are as follows:

- in step c), the machining order of the objects is determined depending on the geometry and/or the relative position of the objects;
- in step b), each of said other objects is assigned either to a category of external objects if this object has an open outline the ends of which meet the exterior envelope, or to a category of internal objects if this object has a closed outline, and, in step c), said machining order is determined depending on the category to which each of said other objects belongs;
- in step b), it is verified whether at least one group of a plurality of objects in the category of internal objects meets a proximity criterion, and, if such is the case, in step d), the machining settings are generated such that the objects of each group are machined in the same reference direction;
- in step d), the machining settings are generated such that the objects of each group are drilled by means of the same drill bit, along parallel drilling axes;
- in step b), it is verified whether at least one group of a plurality of objects in the category of external objects meets a proximity criterion, and it is verified that said group does not interfere with another object, then, in the absence of interference, and, in step d), the machining settings are generated such that the objects of said group are machined by means of the same tool, on a continuous path;
- in step c), the exterior envelope is intended to be machined before the objects belonging to the category of external objects;
- in step c), the machining order of the objects belonging to the category of external objects is determined depending on the minimum radius of curvature of each of said objects;
- provision is made for a step of calculating an indicator of manufacturing constraints, this indicator relating to how complex it will be to machine the optical lens and depending on a least one of the following parameters: the minimum radius of curvature of each object belonging to the category of exterior objects, the depth of each object belonging to the category of interior objects, the depth of each object that extends over only some of the thickness of the optical lens, the face of the optical lens into which each object that extends over only some of the thickness of the optical lens is recessed.
- in step a), said file is determined depending on one or more images of a demonstration lens initially mounted in said spectacle frame and/or on one or more images of the spectacle frame and/or on one or more images of the bare demonstration lens;
- in step d), the machining settings are generated independently of the features of any machining machine liable to be used to machine the optical lens.

DETAILED DESCRIPTION OF AN EXEMPLARY EMBODIMENT

The description which follows with reference to the appended drawings, which are given by way of nonlimiting examples, will make it easy to understand what the invention consists of and how it may be achieved.

In the appended drawings:

FIG. 3 is a table illustrating a method for sequencing the machining of the objects of FIG. 2;

FIG. 4 is a schematic view of a portion of an optical lens; and

FIG. 5 is a schematic perspective view of a portion of a spectacle frame equipped with the optical lens of FIG. 2.

As FIG. 5 shows, a pair of spectacles generally includes a spectacle frame M1 and two optical lenses L1 (a single one of which is shown in FIG. 5) that are fastened to the spectacle frame M1.

The optical lenses L1 will possibly be corrective lenses (i.e. lenses with nonzero refringent powers) or comfort lenses (for example sunglass lenses). In the case where it is a question of corrective lenses, the prescriptions of the future wearer of the pair of spectacles will then need to be taken into account during the manufacture of this pair of spectacles, to ensure the pair of spectacles provides the desired optical correcting characteristics.

The outlines of certain optical lenses, in particular optical lenses intended to be mounted in a semi-rimmed or rimless (fastening to drilled lenses) frame, have complex shapes including for example zones that are curved toward the center of the lens, called zones of negative curvature or concave zones. Such a concave zone 22 may be clearly seen in FIG. 5.

These concave zones generally correspond to decorative details on the outline of the optical lens or to zones in which the optical lens is fastened to the spectacle frame.

Although convex zones are generally machined by means of a roughing wheel or a tool of large diameter such as a miller or a knife (such a tool being inexpensive to use), concave zones in contrast need to be machined with a tool of much smaller diameter.

For machining such lenses, there exists a wide variety of dedicated machining machines equipped with a plurality of tools having many degrees of mobility.

These machines have in common the fact that they all comprise: shafts for blocking the lens to be machined and driving it to pivot; a rotary roughing wheel or a tool of large diameter for machining the edge face of the lens; at least one finishing tool (miller, drill bit, grooving wheel, etc.) for machining the concave zones of the outline of the lens and for drilling the lens; and a controller allowing the various degrees of mobility of the tools with respect to the lens to be controlled, depending on a file of machining settings.

In the example that will be considered here, as FIG. 5 shows, the spectacle lens M1 is of semi-rimmed type, in that it includes two arches 30 under each of which one of the optical lenses L1 is intended to be fastened. These two arches 30 are connected together by a bridge 31 equipped with two nose pads 32. This spectacle frame M1 is here made of a rigid plastic material.

The optical lens L1 shown in FIG. 5, which is the optical lens that will more particularly be considered in the present description, cannot been seen in its entirety in FIG. 5 because of the presence of the spectacle frame M1, which covers it partially.

This optical lens L1, which has (at the time of implementation of the method according to the invention) an initial circular outline, must be machined so as to have a particular shape F1, so that it can be assembled with the spectacle frame M1.

Figure 2:
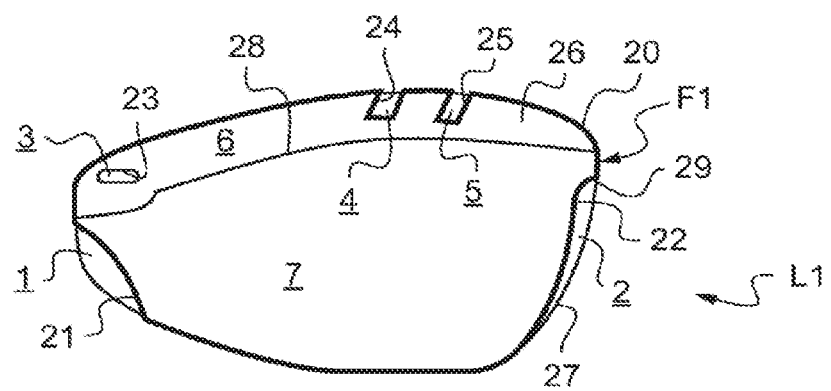
FIG. 2 is a schematic view of the outline of an optical lens, in which various objects characterizing the shape of this outline are shown.

In FIG. 2, the final outline 20 that the optical lens L1 is required to have after machining is shown by a thick line.

It may be seen in this figure that the optical lens L1 requires a drilled hole 23 of oblong shape and four notches 21, 22, 24, 25 to be recessed into its peripheral edge and that it needs to be thinned in an upper portion 26 of its area, in order to be able to be assembled with the spectacle frame M1 and in order for the pair of spectacles, once assembled, to have the desired shape.

The upper portion 26 of the optical lens L1 will in particular be thinned in order to be able to be engaged into a recessed groove provided in the corresponding arch 30 of the spectacle frame M1.

Among the notches, the optical lens L1 requires two identical fastening notches 24, 25 located in this upper portion 26 of the optical lens L1. It also requires a temporal notch 22 so as to define, above this temporal notch 22, a bulge 29 allowing the fastening of the optical lens L1 in the arch 30 to be optimized. It lastly requires a nasal notch 21 in order to allow passage of the corresponding nose pad 32 of the spectacle frame M1.

Of course, this particular shape F1 of the optical lens L1 is illustrated here only by way of example, in order to clearly explain the way in which the present invention works. This particular shape F1 is in no way intended to restrict the scope of the present description.

The objective of the present invention then consists in generating machining settings that are dependent on the shape of the pair of spectacles to be obtained, that are optionally also dependent on the prescriptions P1 of the future wearer of the pair of spectacles, but that are not dependent on the characteristics of the machining machine that will be used to machine the optical lens L1.

Thus, it will be possible to use the machining settings in any machining machine, the latter only needing to interpret these settings with regard to its own characteristics (diameters of its tools, available tools, etc.) to machine the optical lens L1 to the desired shape.

This method for generating the settings for machining the optical lens L1 is composed of four main steps consisting in:

a) acquiring a file characterizing the particular shape F1 to which the optical lens L1 must be machined in order to allow it to be mounted in the spectacle frame M1, b) decomposing said particular shape F1 into a plurality of distinct objects 1, 2, 3, 4, 5, 6, 7, including an exterior envelope 7 inside of which the other objects 1, 2, 3, 4, 5, 6 are located, c) determining a machining order of said other objects 1, 2, 3, 4, 5, 6, and d) generating the machining settings depending on said machining order.

This generating method will possibly be implemented by a computing machine, such as a computer, including a processor (CPU), a random access memory (RAM), a read-only memory (ROM), and various input and output interfaces.

By virtue of its input interfaces, the computing machine is able to receive input signals originating from various acquiring means. An acquiring means will possibly be a touch screen or a keyboard, allowing the user to input information such as the prescriptions P1 of the future wearer of the pair of spectacles. Another acquiring means will possibly be a device for determining the particular shape F1. The input signals will then possibly relate to the particular shape F1 and to the information input by the user.

The read-only memory for its part stores data used in the context of the controlling method described below. It in particular stores a computer application, consisting of computer programs comprising instructions the execution of which by the processor allows the method described above to be implemented by the computing machine.

By virtue of its output interfaces, the computing machine is able to transmit the machining settings to the controller of the machining machine used to machine the optical lens L1.

This machining takes place in two phases, namely a roughing phase in which the initial (generally circular) outline of the optical lens L1 is machined to a shape close to the particular shape F1 (by means of the tool of large diameter), and a finishing step in which the portions of the optical lens L1 that could not be formed by means of the tool of large diameter are machined with finishing tools.

Figure 1:
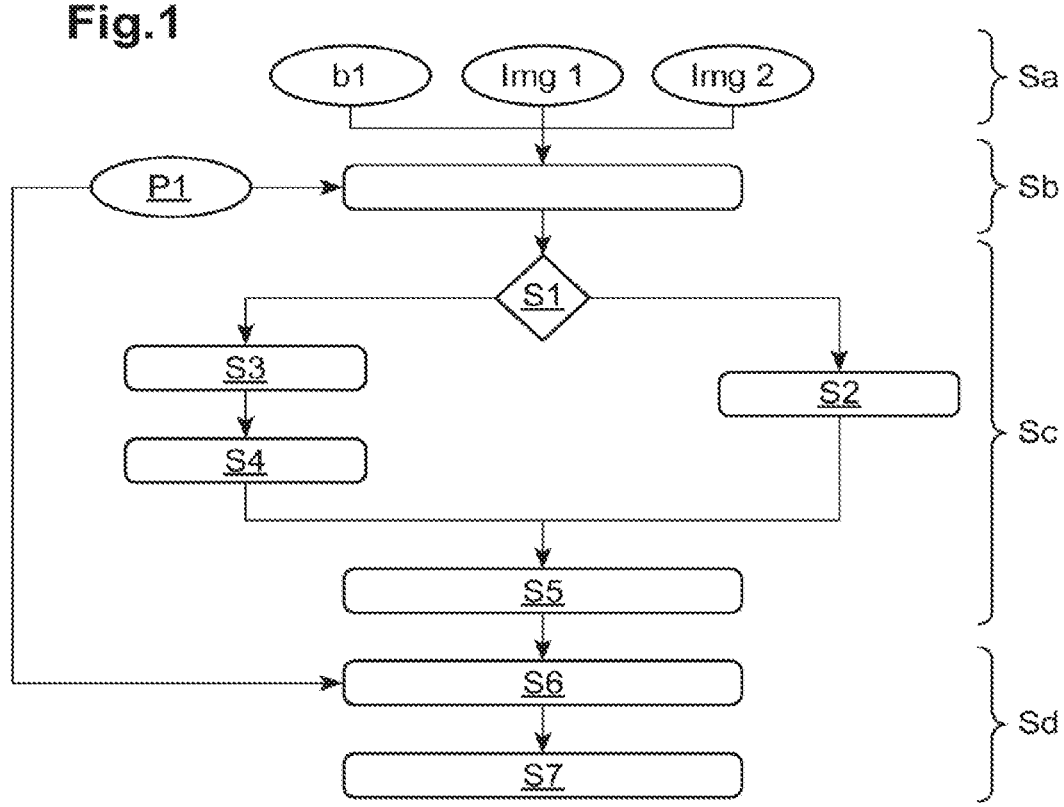
FIG. 1 is a flowchart illustrating the steps of an algorithm allowing a method for generating settings for machining an optical lens according to the invention to be implemented.

FIG. 1 shows a flowchart illustrating the algorithm implemented by the computing machine in order to generate the settings for machining the optical lens L1.

Prior to step a) (referenced Sa in FIG. 1), the spectacle frame M1 is delivered to the user (here the optician) with two demonstration lenses that are intended to be removed from the spectacle frame M1 and replaced by two optical lenses L1.

These two optical lenses L1 initially have a circular outline, that must be machined to the desired shape (namely the particular shape F1).

In step a), the particular shape F1, to which the optical lens L1 in question must be machined, is acquired using the corresponding demonstration lens.

To do this, the optician uses the determining device that is designed to exploit the shape of the demonstration lens in order to deduce therefrom the particular shape F1. Such a device, and the way in which this device may be used to implement step a), are for example clearly described in the patent application filed under the number FR1457240 (which had not yet been published when the present patent application was filed).

To summarize, this device includes a holder for blocking the demonstration lens and means for acquiring images. The way in which this device is used then consists in acquiring various images Img1, Img2 including at least one face-on image of the bare presentation lens and one face-on image of the presentation lens mounted in its spectacle frame M1. It will possibly be envisioned here to also acquire a third image of the bare spectacle frame M1 face-on and a fourth image of the presentation lens side-on.

It will be understood that the two images Img1, Img2 and optionally the third image will allow the particular shape F1 that the optical lens L1 must have after machining to be determined.

It will also be understood that the fourth image will allow a value of the curvature of the front face of the demonstration lens, which is called the base b1, which will be considered to be equal to the curvature of the arch 30 of the spectacle frame M1, to be obtained.

At the end of this step a), the computing machine thus has in memory a file illustrating the particular shape F1 that the optical lens L1 must have after machining.

This particular shape F1, shown in FIG. 2, is characterized by the final outline 20 (thick line), by the outline of the drilled hole 23, and by a demarcation line 28 between that portion of the area of the optical lens L1 which will be covered by the spectacle frame M1 and that portion of the surface of the optical lens L1 which will be visible.

This particular shape F1 is here considered in projection onto a mean general plane of the optical lens L1.

The expression "general mean plane of the lens" may for example be understood to mean the plane that is closest, on average, to the outline of the corresponding rim of the spectacle frame. It could as a variant be a question of another plane, such as for example the plane through which the initial outline of the lens passes (before machining).

A plurality of "boxes" will possibly be defined with respect to this particular shape F1.

A first box, called the "boxing-system" box, corresponds to the rectangle that circumscribes the projection of the final outline 20 onto the general mean plane of the lens, and two sides of which are parallel to horizontal.

In step b) (referenced Sb in FIG. 1), the particular shape F1 is divided into a plurality of distinct objects 1, 2, 3, 4, 5, 6, 7.

Other boxes, called "object" boxes, will possibly be defined with respect to each of these objects 1, 2, 3, 4, 5, 6, 7. Each of these "object" boxes corresponds to the rectangle that circumscribes the projection of the outline of this object onto the general mean plane of the lens, and two sides of which are parallel to horizontal.

The particular shape F1 can be divided into objects in various ways.

In the present case, this is here done, in a plurality of successive operations, in the following way.

The first operation consists in defining the exterior envelope 7, which it will be recalled encompasses all the other objects 1, 2, 3, 4, 5, 6.

This exterior envelope 7 is defined by a roughing line 27, which illustrates the shape of the outline to which the optical lens L1 will be edged by means of the tool of large diameter.

This roughing line 27 is defined as being coincident with the largest possible portion of the final outline 20 and as having, at every point, a convex shape.

The roughing line 27 thus connects, as shown in FIG. 2, the ends of the outlines of the fastening notches 24, 25 and of the nasal notch 21.

It in contrast extends over a length larger than that of the temporal notch 22, so as to have a convex shape at every point.

The second operation consists in characterizing the particular shape F1 into a plurality of other objects, belonging to one or other of the following categories:
 a category of external objects, and
 a category of internal objects.

The objective is that once these objects have been characterized, their shapes and that of the exterior envelope 7 allow the shape of the final outline 20 to be characterized.

During this operation, the computing machine defines each external object as corresponding to a zone of the optical lens L1 that is circumscribed between the roughing line 27 and the final outline 20. Thus, such an external object is considered to have an outline that is at least partially concave, that is open and the ends of which meet the final outline 20.

In the present case, five external objects 1, 2, 4, 5, 6 are here defined as corresponding to the outlines of the fastening notches 24, 25, of the temporal notch 2, of the nasal notch 1, and to the outline of that zone of the optical lens L1 which is circumscribed between the demarcation line 28 and the upper edge of the external outline 20.

Among these external objects, the computing machine determines whether the object is emergent (i.e. a through-object) or not, i.e. whether it extends through only some of the thickness of the lens or right through the thickness of the lens. If it is non-emergent, the computing machine determines whether this object is recessed into a front face or back face of the optical lens L1.

In the present case, a single object is here defined by the computing machine as being non-emergent: the external object 6 corresponding to that the zone of the optical lens L1 which is circumscribed between the demarcation line 28 and the upper edge of the external outline 20.

The computing machine defines, inside the final outline 20, an internal object in each zone of the lens that is drilled. Such an internal object has an outline that is closed.

In the present case, a single internal object 3 is here defined level with the drilled hole 23.

Step c) (referenced Sc in FIG. 1) consists in sequencing the machining of the internal objects 3 and external objects 1, 2, 4, 5, 6 in such a way that the machining of the optical lens L1 can be carried out as rapidly as possible.

This sequencing is carried out depending on the geometry and/or the relative position of these objects 1, 2, 3, 4, 5, 6 and/or depending on the category to which each of these objects 1, 2, 3, 4, 5, 6 belongs.

As FIG. 1 shows, this step c) is carried out, in a plurality of operations S1 to S5, in the following way.

The first operation S1 consists in determining the objects of the various categories.

Then, the second operation S2 is implemented only for just the internal objects 3.

In this second operation S2, the computing machine verifies whether at least one group of a plurality of internal objects meets a proximity criterion.

More precisely, the computing machine verifies whether the centers of the "object" boxes of a plurality of internal objects are located at a distance from one another that is smaller than a preset threshold (for example of about one centimeter).

Here, since there is only a single internal object 3, no group of internal objects can be formed.

In contrast, if a plurality of internal objects met this proximity criterion, the computing machine would group these internal objects so that they were machined in the same reference direction.

In the case where the internal objects are drilled by means of the same drill bit, the machining settings are then generated such that the internal objects of each group are drilled by the drill bit, along parallel drilling axes.

In the embodiment shown in the figures, the computing machine simply stores in memory, at this stage of the method, a tool path for the drilling of the drilled hole 23 through the optical lens L1.

Given that the drilled hole 23 has an oblong outline, this path will possibly be coincident with the outline of this drilled hole 23. This path will then correspond to the path that the cutting envelope of the tool will need to take to drill the optical lens L1 to the desired shape.

The third operation S3 is for its part implemented for the external objects 1, 2, 4, 5, 6.

In this third operation S3, the computing machine verifies whether at least one group of a plurality of external objects meets a proximity criterion and, if such is the case, whether this group interferes with another object or not.

More precisely, the computing machine firstly verifies whether the centers of the "object" boxes of a plurality of external objects are located at a distance from one another smaller than a preset threshold (for example of about one centimeter).

To clearly illustrate this operation, a case in which two external objects 8, 9 meet the proximity criterion and in which these two external objects 8, 9 do not interfere with any other object has been shown in FIG. 4. These two external objects 8, 9 are then considered by the computing machine to form part of the same group 10.

Thus, the machining settings will be generated in such a way that the two external objects 8, 9 are machined by the same tool (for example by a miller), in one and the same pass of this tool.

As the dashed curve in FIG. 4 shows, the path 40 of the cutting envelope of the tool (here, the miller) will then be calculated to trace the outlines of the two external objects 8, 9 and to be continuous and continuously differentiable. This path 40 will be calculated in such a way that the point of entrance Pe of the tool into the lens (it will be recalled that, at this stage, the lens will have been roughed beforehand to the roughing line 27) is coincident with one end of the outline of one of the objects 8, and that the point of exit Ps of this tool from the lens is located level with the opposite end of the outline of the other of the objects 9.

Between these two points, i.e. the point of entrance Pe and the point of exit Ps, it will be understood that the tool will enter into the lens, then will exit therefrom, then will re-enter into the lens and then will exit therefrom.

In the embodiment shown in FIGS. 2 and 5, the computing machine simply stores in memory, at this stage of the method, a tool path for machining the two fastening notches 24, 25 (which may be grouped), a tool path for the nasal notch 21 and a tool path for the temporal notch 22.

Each of these paths will be coincident with the outline of the corresponding notch 21, 22. Each path will then correspond to the path that the cutting envelope of the tool will need to take to edge the optical lens L1 to the desired shape.

At this stage, to clearly illustrate the case where a group of a plurality of external objects meets the proximity criterion but interferes with another object, the case of two notches located on either side of a corner formed by the exterior envelope may be considered. The risk would then be that the path allowing the two notches to be machined would interfere with the exterior envelope, running the risk that using this path to machine the two notches would clip the corner of the lens. It will thus be understood that it is recommended to avoid such a situation by not grouping the machining of the two notches.

In this third operation S3, the computing machine generates a particular tool path for machining the non-emergent exterior object 6.

This path is here three-dimensional, since it is calculated depending on the thickness of the material to be removed with respect to the front face or with respect to the back face of the lens.

This path will possibly include two components (x, y) in the mean general plane of the lens (these components being generated such that the path follows the demarcation line 28) and another component (z) corresponding to the thickness of material to be removed.

It will be noted in this respect that it is important here to take into account whether the lens is to be machined from its back face (general case) or from its front face (particular case in which the base b1 of the demonstration lens is very different from that of the optical lens L1 to be machined).

Once again, the path of the tool will be defined between a point of entrance of the tool into the lens and a point of exit of the tool from the lens.

The fourth operation S4 consists in extending the paths of the tools before the point of entrance Pe and beyond the point of exit Ps (for the external objects).

To clearly understand this operation, the reader may refer to FIG. 4, in which the path of the tool (which path has been represented by dashed lines) has been extended (dash-dots).

This operation consists in the processor extending the paths calculated at the point of entrance Pe (and at the point of exit Ps) along the axis of the tangent to the path calculated at the point of entrance Pe (or of the point of exit Ps). The path will be extended a distance such that when the tool is located at one end of its path, it is located at a distance from the center of the "boxing-system" box that is larger than or equal to the maximum distance between the center of this "boxing-system" box and the external outline 20.

In this way, it will be possible to pivot the optical lens L1 without it striking the tool.

These paths could also possibly be extended in various directions, in order in particular to ensure that no sharp points are created during the machining.

Lastly, in the fifth operation C5, the computing machine determines the order in which the internal objects 3 and external objects 1, 2, 4, 5, 6 must be machined in order to decrease a priori as much as possible the duration of the machining of the lens.

The first object machined will always be the exterior envelope 7, so that the initial (generally circular) shape of the optical lens is machined to the shape of the roughing line 27 (which it will be recalled is convex), by means of the tool of large diameter.

Provision will then possibly be made to firstly machine the internal objects 3, or to firstly machine the external objects 1, 2, 4, 5, 6.

In the present description, the external objects 1, 2, 4, 5, 6 are machined before the internal objects 3.

The external objects 1, 2, 4, 5, 6 are intended to be machined singly or in groups.

The machining order of the external objects 1, 2, 4, 5, 6 is determined depending on the minimum radius of curvature RCmin of each of said objects 1, 2, 4, 5, 6, from that having the largest minimum radius of curvature to that having the smallest minimum radius of curvature.

This machining order is also determined depending on the emergent or non-emergent character of the objects. Non-emergent objects will here be machined together, after the emergent objects.

In this way, if a tool change is necessary to machine these external objects 1, 2, 4, 5, 6, in particular because of their minimum radius of curvature or their non-emergent character, this change will be made only once. It will be recalled in this respect that it is always preferable to use a tool of large diameter to machine an object, since the cost of the machining is then lower. This is the reason why the machining may start off using, for the objects having large minimum radii of curvature, tools of large diameters, tools of lesser diameters then being used for the other objects.

As the table in FIG. 3 shows, the external object machined first will therefore here be the nasal notch 1, followed by the temporal notch 2.

Since the minimum radii of curvature of the outlines of the two fastening notches 24, 25 are identical, the notch machined first will be the notch closest to the temporal notch 2.

The non-emergent external object 6 will then in turn be machined.

Lastly, the internal objects will be intended to be machined in groups or singly. Provision will possibly be made to machine these internal objects depending on their distribution around the center of the "boxing-system" box, for example in the clockwise direction.

It will be noted here that the emergent or non-emergent character of an internal object will not be considered when determining the machining order of these internal objects. As a variant, it could be otherwise.

The final step d) consists in generating the machining settings.

As FIG. 1 shows, this step d) is carried out in two successive operations S6 and S7.

The first operation S6 consists in calculating an indicator of manufacturing constraints, this indicator relating to how complex the optical lens L1 will be to machine.

This indicator of constraints is intended to allow to what extent a machining machine will be able, or not, to machine the optical lens L1 to be easily determined.

In practice, this indicator of constraints will possibly be a score out of 10, or a set of data, easily allowing it to be determined whether, on account of the tools with which it is equipped, a machining machine will or will not be able to machine the optical lens L1.

This indicator of constraints is here determined depending on at least one of the following parameters:
- the minimum radius of curvature of each object 1, 2, 4, 5, 6 belonging to the category of exterior objects,
- the thickness of the lens level with each object 3 belonging to the category of interior objects,
- the depth of each non-emergent object 6,
- the face of the optical lens L1 into which each non-emergent object 6 is recessed.

The second operation S7 consists in generating the machining settings depending on said machining order, on the calculated paths, and on this indicator of constraints.

These machining settings will be generated in the form of a file that is exploitable by different machining machines.

The invention claimed is:

1. A method for generating settings for machining an optical lens, the method comprising steps of:
   a) acquiring a file characterizing the shape to which the optical lens is to be machined in order to allow the optical lens to be mounted in a spectacle frame;
   b) decomposing said shape into a plurality of distinct objects, including an exterior envelope inside of which all other objects other than the exterior envelope are located;
   c) determining a machining order of said other objects to determine in what order the other objects are to be machined, and
   d) generating the machining settings depending on said machining order.

2. The generating method as claimed in claim 1, wherein, in step c), the machining order of said other objects is determined depending on the geometry or the relative position of the other objects.

3. The generating method as claimed in claim 1, wherein, in step b), each of said other objects is assigned either to a category of external objects when the object has an open outline the ends of which meet the exterior envelope, or to a category of internal objects when the object has a closed outline, and
   wherein, in step c), said machining order is determined depending on the category to which each of said other objects belongs.

4. The generating method as claimed in claim 3, wherein:
   in step b), verifying whether at least one group of a plurality of objects in the category of external objects meet a proximity criterion, and verifying that said group does not interfere with another object,
   then, in the absence of interference, in step d), the machining settings are generated such that the objects of said group are machined by the same tool, on a continuous path.

5. The generating method as claimed in claim 4, wherein, in step c), the machining order is determined such that the exterior envelope is machined before the objects belonging to the category of external objects.

6. The generating method as claimed in claim 4, wherein, in step c), the machining order of the objects belonging to the category of external objects is determined depending on the minimum radius of curvature of each of the objects belonging to the category of external objects.

7. The generating method as claimed in claim 3, wherein:
   in step b), verifying whether at least one group of a plurality of objects in the category of internal objects meets a proximity criterion, and
   when the at least one group of the plurality of objects in the category of internal objects meets the proximity criterion in step d), the machining settings are generated such that the objects of each group are machined in the same reference direction.

8. The generating method as claimed in claim 7, wherein, in step d), the machining settings are generated such that the objects of each group are drilled by a same drill bit, along parallel drilling axes.

9. The generating method as claimed in claim 8, wherein:
   in step b), verifying whether at least one group of a plurality of objects in the category of external objects meet a proximity criterion, and verifying that said group does not interfere with another object,
   then, in the absence of interference, in step d), the machining settings are generated such that the objects of said group are machined by the same tool, on a continuous path.

10. The generating method as claimed in claim 8, wherein, in step c), the machining order is determined such that the exterior envelope is machined before the objects belonging to the category of external objects.

11. The generating method as claimed in claim 8, wherein, in step c), the machining order of the objects belonging to the category of external objects is determined depending on the minimum radius of curvature of each of the objects belonging to the category of external objects.

12. The generating method as claimed in claim 3, wherein, in step c), the machining order is determined such that the exterior envelope is machined before the objects belonging to the category of external objects.

13. The generating method as claimed in claim 12, wherein, in step c), the machining order of the objects belonging to the category of external objects is determined depending on the minimum radius of curvature of each of the objects belonging to the category of external objects.

14. The generating method as claimed in claim 3, wherein, in step c), the machining order of the objects belonging to the category of external objects is determined depending on the minimum radius of curvature of each of the objects belonging to the category of external objects.

15. The generating method as claimed in claim 3, further comprising calculating an indicator of manufacturing constraints, the indicator relating to a level of complexity of machining the optical lens and depending on a least one of the following parameters:
   the minimum radius of curvature of each object belonging to the category of exterior objects,
   the depth of each object belonging to the category of interior objects, the depth of each object that extends over only some of the thickness of the optical lens, and the face of the optical lens into which each object that extends over only some of the thickness of the optical lens is recessed.

16. The generating method as claimed in claim 7, wherein:

in step b), verifying whether at least one group of a plurality of objects in the category of external objects meet a proximity criterion, and verifying that said group does not interfere with another object, then, in the absence of interference, in step d), the machining settings are generated such that the objects of said group are machined by the same tool, on a continuous path.

17. The generating method as claimed in claim 7, wherein, in step c), the machining order is determined such that the exterior envelope is machined before the objects belonging to the category of external objects.

18. The generating method as claimed in claim 7, wherein, in step c), the machining order of the objects belonging to the category of external objects is determined depending on the minimum radius of curvature of each of the objects belonging to the category of external objects.

19. The generating method as claimed in claim 1, wherein, in step a), said file is determined depending on one or more images of a demonstration lens mounted in said spectacle frame or on one or more images of the spectacle frame or on one or more images of a bare demonstration lens.

20. The generating method as claimed in claim 1, wherein, in step d), the machining settings are generated independently of features of any machining machine configured to be used to machine the optical lens.

* * * * *